(12) United States Patent
Plee et al.

(10) Patent No.: US 8,808,580 B2
(45) Date of Patent: Aug. 19, 2014

(54) THERMOPLASTIC AND/OR ELASTOMERIC COMPOSITE BASED ON CARBON NANOTUBES AND GRAPHENES

(75) Inventors: Dominique Plee, Lons (FR); Alexander Korzhenko, Pau (FR)

(73) Assignee: Arkema France, Colombes (FR)

( * ) Notice: Subject to any disclaimer, the term of this patent is extended or adjusted under 35 U.S.C. 154(b) by 407 days.

(21) Appl. No.: 13/089,723

(22) Filed: Apr. 19, 2011

(65) Prior Publication Data

US 2011/0260116 A1 Oct. 27, 2011

(30) Foreign Application Priority Data

Apr. 22, 2010 (FR) ...................................... 10 53088

(51) Int. Cl.

| | |
|---|---|
| *H01B 1/04* | (2006.01) |
| *H01B 1/06* | (2006.01) |
| *H01B 1/24* | (2006.01) |
| *B82Y 30/00* | (2011.01) |
| *C08J 5/00* | (2006.01) |
| *C08L 9/02* | (2006.01) |
| *C08L 33/00* | (2006.01) |
| *C08L 21/00* | (2006.01) |
| *C08K 3/04* | (2006.01) |

(52) U.S. Cl.
CPC . *C08J 5/005* (2013.01); *H01B 1/24* (2013.01); *C08L 9/02* (2013.01); *C08L 33/00* (2013.01); *B82Y 30/00* (2013.01); *C08J 2321/00* (2013.01); *C08L 21/00* (2013.01); *C08K 2201/011* (2013.01); *C08K 3/04* (2013.01); *Y10S 977/734* (2013.01); *Y10S 977/742* (2013.01); *Y10S 977/75* (2013.01); *Y10S 977/752* (2013.01); *Y10S 977/778* (2013.01); *Y10S 977/783* (2013.01); *Y10S 977/932* (2013.01)
USPC ........... 252/510; 252/502; 252/511; 977/734; 977/742; 977/750; 977/752; 977/778; 977/783; 977/932

(58) Field of Classification Search
USPC .......... 252/500–511; 977/734, 742, 750, 752, 977/778, 783, 932
See application file for complete search history.

(56) References Cited

U.S. PATENT DOCUMENTS

| | | | |
|---|---|---|---|
| 5,686,534 A | 11/1997 | Bavard et al. | |
| 5,886,112 A | 3/1999 | Vuillemin et al. | |
| 2004/0009346 A1* | 1/2004 | Jang et al. ...................... | 428/336 |
| 2004/0234445 A1 | 11/2004 | Serp et al. | |
| 2007/0154771 A1* | 7/2007 | Jang et al. ........................ | 429/38 |
| 2008/0020193 A1* | 1/2008 | Jang et al. ................... | 428/292.1 |
| 2008/0161476 A1* | 7/2008 | Sugasaki ........................ | 524/496 |
| 2008/0312364 A1 | 12/2008 | Piccione et al. | |
| 2009/0008610 A1 | 1/2009 | Bordere et al. | |
| 2009/0075199 A1* | 3/2009 | Lungu .......................... | 430/281.1 |
| 2009/0081462 A1* | 3/2009 | Miyoshi et al. ................ | 428/407 |
| 2009/0160920 A1* | 6/2009 | Badesha et al. .................. | 347/88 |
| 2010/0006442 A1* | 1/2010 | Lochtman et al. ............... | 205/50 |
| 2010/0136341 A1* | 6/2010 | Kirkor et al. ................... | 428/408 |
| 2010/0143798 A1* | 6/2010 | Zhamu et al. .................. | 429/212 |
| 2010/0201023 A1 | 8/2010 | Piccione et al. | |
| 2010/0203328 A1* | 8/2010 | Hochstetter et al. .......... | 428/368 |
| 2011/0040007 A1* | 2/2011 | Chandrasekhar et al. .... | 524/404 |
| 2011/0152435 A1* | 6/2011 | Morishita et al. .............. | 524/504 |
| 2011/0180140 A1* | 7/2011 | Zhai et al. ...................... | 136/256 |
| 2011/0201731 A1* | 8/2011 | Korzhenko et al. ........... | 524/127 |
| 2012/0103670 A1* | 5/2012 | Lettow ........................... | 174/258 |
| 2012/0149824 A1* | 6/2012 | Hocke et al. ................... | 524/496 |
| 2012/0292578 A1* | 11/2012 | Bacher et al. .................. | 252/511 |

FOREIGN PATENT DOCUMENTS

| | | | | |
|---|---|---|---|---|
| EP | 1873200 | | 1/2008 | |
| FR | WO2009007617 A2 * | | 1/2009 | .................. C08J 5/04 |
| WO | WO2010/046606 A1 * | | 4/2010 | .................. C08J 5/00 |

OTHER PUBLICATIONS

Yan et al. ("Preparation of graphene nanosheet/carbon nanotube/polyaniline composite as electrode material for supercapacitors." J. of Power Sources, 195, p. 3041-3045, Online Nov. 11, 2009).*
Novoselov, K.S., et al. Electric Field Effect in Atomically Thin Carbon Films, Science, vol. 306, Oct. 22, 2004, pp. 666-669.
Janowska I., et al., Microwave Synthesis of Large Few-Layer Graphene Sheets in Aqueous Solutions of Ammonia, Nano Research, vol. 3, (2010), pp. 126-137.
Jiao, L., et al. Narrow Graphene Nanoribbions From Carbon Nanotubes, Nature, vol. 458, Apr. 16, 2009, pp. 877-880.
Stankovich, S., et al. Graphene-Based Composite Materials, Nature, vol. 442, (2006), pp. 282-286.
Flahaut., E. et al. Gram-Scale CCVD Synthesis of Double-Walled Carbon Nanotubes, Chem Comm, (2003), pp. 1442-1443.

* cited by examiner

*Primary Examiner* — Tri V Nguyen
(74) *Attorney, Agent, or Firm* — Buchanan Ingersoll & Rooney

(57) ABSTRACT

The present invention relates to a composite of carbon nanotubes and of graphenes in agglomerated solid form comprising:
   a) carbon nanotubes, the content of which represents from 0.1% to 50% by weight, preferably from 10% to 40% by weight relative to the total weight of the composite;
   b) graphenes, the content of which represents from 0.1% to 20% by weight, preferably from 1% to 10% by weight relative to the total weight of the composite; and
   c) a polymer composition comprising at least one thermoplastic polymer and/or one elastomer.

The present invention also relates to a process for preparing said composite, its use for the manufacture of a composite product, and also to the various applications of the composite product.

14 Claims, 2 Drawing Sheets

THERMOPLASTIC AND/OR ELASTOMERIC COMPOSITE BASED ON CARBON NANOTUBES AND GRAPHENES

This application claims priority to French application number 10.53088 filed Apr. 4, 2010.

FIELD OF THE INVENTION

The present invention relates to composites based on carbon nanotubes and graphenes, to their preparation process and to their use for the manufacture of composite end products.

BACKGROUND OF THE INVENTION

Carbon nanotubes (or CNTs) possess particular crystalline structures, of tubular and hollow shape, formed by rolling up one or more individual graphite sheets. In the case of nanotubes comprising several roiled-up sheets or walls, the rolling-up operation is coaxial along a longitudinal direction. A distinction is thus made between single-walled nanotubes (or SWNTs) and multiwalled nanotubes (or MWNTs).

CNTs may be prepared by known methods. There are several processes for synthesizing CNTs, especially electrical discharge, laser ablation and chemical vapour deposition (CVD) which enables large quantities of carbon nanotubes to be manufactured, and therefore obtained for a manufacturing cost compatible with their bulk use. The CVD process specifically consists in injecting a carbon source at relatively high temperature onto a catalyst, which may itself consist of a metal such as iron, cobalt, nickel or molybdenum, which is supported on an inorganic solid such as alumina, silica or magnesia. The carbon sources may include methane, ethane, ethylene, acetylene, ethanol, methanol or even a mixture of carbon monoxide and hydrogen (the HIPCO process).

CNTs are produced, for example, by Arkema, Nanocyl, Iljin and Showa Denko.

Graphenes are isolated and individualized sheets of graphite, but very often assemblies comprising between one and a few tens of sheets are referred to as graphenes. Unlike carbon nanotubes, they have a more or less planar structure, with corrugations due to thermal agitation that are even greater when the number of sheets is reduced. A distinction is made between FLGs (Few Layer Graphenes), NGPs (Nanosized Graphene Plates), CNSs (Carbon NanoSheets) and GNRs (Graphene NanoRibbons).

Various processes for preparing graphenes have been proposed, including that of A. K. Geim of Manchester, which consists in peeling, in successive layers, graphite sheets by means of an adhesive tape ("Scotch tape" method), Geim, A. K., Science (2004), 306, 666.

It is also possible to obtain particles of graphenes by cutting carbon nanotubes along the longitudinal axis ("Micro-Wave Synthesis of Large Few-Layer Graphene Sheets in Aqueous Solution of Ammonia", Janowska, I. et al., NanoResearch, 2009 or "Narrow Graphene nanoribbons from Carbon Nanotubes", Jiao, L. et al., Nature. vol. 458, p. 877-880, 2009. Other processes have been widely described in the literature.

Graphenes are produced, for example, by Vorbeck Materials and Angstron Materials.

From a mechanical standpoint, the CNTs exhibit excellent stiffness (measured by Young's modulus), comparable to that of steel, while at the same time being extremely light. Furthermore, they exhibit excellent electrical and thermal conductivity properties making it possible to envisage using them as additives in order to confer these properties on various materials, especially macromolecular materials, such as thermoplastic or elastomeric polymer materials.

Various approaches have been envisaged up till now for dispersing moderate amounts of CNTs in polymer matrices, for the purpose in particular of improving their electrostatic dissipation capability without affecting their mechanical properties, and thus of allowing the manufacture, from said matrices, of electronic components or coating panels, for example for the motor vehicle industry.

Furthermore, from the industrial standpoint, it is desirable to provide composites highly filled with CNTs and capable of being diluted to the desired concentration in various polymer matrices.

Unfortunately, CNTs prove to be difficult to handle and disperse, because of their small size, their pulverulence and possibly, when they are obtained by the CVD technique, their entangled structure which moreover generates strong van der Waals interactions between their molecules.

The poor dispersibility of the CNTs significantly affects the performances of the composites that they form with the polymer matrices into which they are introduced. In particular, the appearance of nanocracks, that are formed in the nanotube aggregates, is observed which results in an embrittlement of the composite. Furthermore, as far as the CNTs are poorly dispersed, it is necessary to increase their content in order to attain a given electrical and/or thermal conductivity.

The poor dispersibility of the carbon nanotubes is especially observed in the case of thermoplastic and/or elastomeric polymer matrices, in particular when the polymer is used in the form of granules, as described, in particular, in document US 2004/026581.

In order to overcome these drawbacks, various solutions have already been proposed in the prior art.

One solution, described in document WO 09/047,466 by the Applicant, consists in preparing a masterbatch from carbon nanotubes in powder form and from a thermoplastic and/or elastomeric polymer in powder form, the masterbatch being itself in a solid agglomerated form such as a granule; next, this masterbatch may be introduced into a thermoplastic and/or elastomeric polymer composition.

Another solution consists in producing a CNT dispersion in a solvent and a monomer and in carrying out an in situ polymerization resulting in the formation of functionalized CNTs. This solution is however complex and may prove to be expensive depending on the products used. Moreover, the grafting operations run the risk of damaging the structure of the nanotubes and, as a consequence, their electrical and/or mechanical properties.

Furthermore, attempts have been made to mix CNTs with a thermoplastic polymer matrix in a compounding tool conventionally used for obtaining composites based on thermoplastic polymers. However, it has been observed that, in this case, introducing a large amount (greater than 10% by weight) of CNTs into the polymer matrix generally has the effect of increasing the viscosity of the compound in the mixing tool, resulting in the screw of the mixer being blocked, requiring the line speed to be reduced and consequently having a negative impact on productivity. Furthermore, stiffening of the composite may result in self-heating which may lead to degradation of the polymer and consequently, in the presence of the CNTs, the formation of a contaminating coating on the walls of the barrels and the screws of the mixer. This results not only in unacceptable contamination of the composite, but also in an increase in the power drawn by the mixer (about 10% over 10 hours of mixing), which then exceeds the power limit of the machine and causes an inadvertent stoppage of said machine. The mixer must then be unblocked and cleaned, thus resulting in a production stoppage.

It has been suggested in application EP 1 995 274 by the Applicant to bring nanotubes into contact with a given plasticizer, in order to form a pre-composite which may then be introduced into a polymer matrix. This solution effectively reduces the viscosity of the mixture, the torque in the extruder and the heating, but has the effect of reducing the amount of polymer.

At the same time, a certain number of studies have shown that it was possible to disperse graphenes in polymer matrices. The article "Graphene-based composite materials", by Stankovich et al., Nature. vol. 442, p. 282-286 (2006) shows that it is possible to prepare polystyrene-graphene composites by mixing, via a DMF solvent route, polystyrene and graphenes previously grafted by phenyl isocyanate groups. After precipitation via addition of methanol and reduction, the composite is agglomerated by hot-pressing. The electrical percolation threshold is evaluated at 0.1 vol %. For a fraction of 0.5%, the conductivity is 0.1 S/m. However, this method is laborious and expensive.

There is therefore still a need to provide a simple and inexpensive industrial process for continuously preparing composites containing carbon nanotubes, in polymer matrices, without appreciably degrading either the nanotubes or the matrix, and without contaminating the equipment, while at the same time providing an electrical conductivity to the matrix.

DETAILED DESCRIPTION OF THE INVENTION

Figure 1:
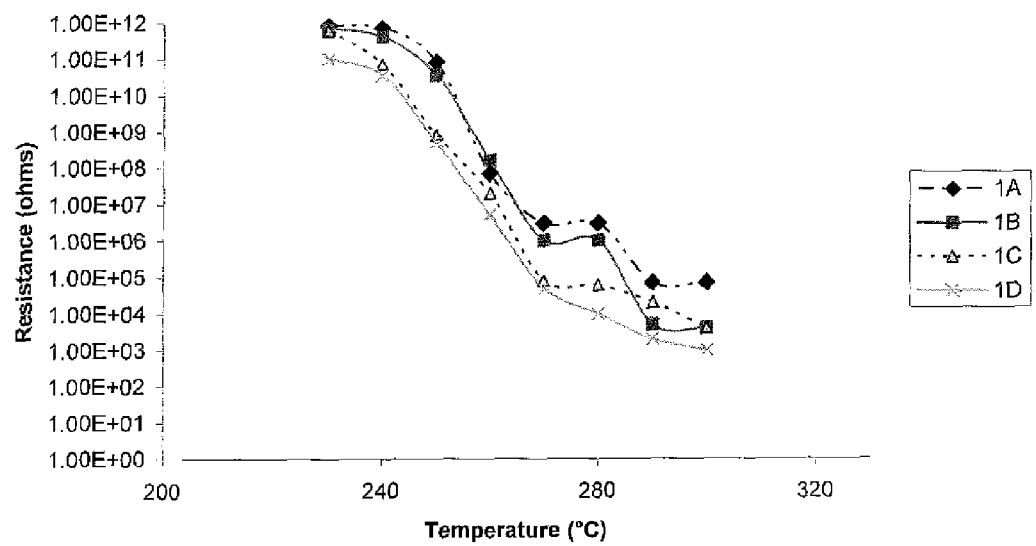
FIG. 1 illustrates the resistivity curve as a function of temperature of composite end products according to the invention and of comparative composite end products, based on PA-12.

In order to provide a response to these contradictory requirements, the Applicant has taken an interest in graphenes, added as additives into a polymer matrix, in addition to nanotubes, and has discovered that the introduction of a small amount of graphenes has a synergistic effect with the nanotubes, both on the electrical conductivity properties, but also on the provision of a lubricating function, capable of reducing the viscosity of the mixtures and therefore the energy consumed during compounding. This effect is, according to the Applicant, due to the two-dimensional aspect ratio, different from that of unidimensional nanotubes. Furthermore, the nanotube/graphene mixtures make it possible to obtain better thermal conductivities than the nanotubes alone.

It has become apparent to the Applicant that a composite in agglomerated solid form comprising carbon nanotubes and graphenes in a polymer matrix can be used in order to easily integrate carbon nanotubes into various thermoplastic and/or elastomeric polymer compositions.

According to a first aspect, the present invention relates to a composite of carbon nanotubes and of graphenes in agglomerated solid form comprising:

a) carbon nanotubes, the content of which represents from 0.1% to 50% by weight, preferably from 10% to 40% by weight relative to the total weight of the composite;

b) graphenes, the content of which represents from 0.1% to 20% by weight, preferably from 1% to 10% by weight relative to the total weight of the composite; and c) a polymer composition comprising at least one thermoplastic polymer and/or an elastomer.

The carbon nanotubes that are incorporated into the composition of the composite according to the invention may be of single-walled, double-walled or multiwalled type. The double-walled nanotubes may especially be prepared as described by FLAHAUT et al. in $Chem.\ Com.$ (2003), 1442. The multiwalled nanotubes may, for their part, be prepared as described in document WO 03/02456.

The nanotubes used according to the invention customarily have an average diameter ranging from 0.1 to 200 nm, preferably from 0.1 to 100 nm, more preferably from 0.4 to 50 nm and better still from 1 to 30 nm, for example from 3 to nm, and advantageously have a length of more than 0.1 µm and advantageously from 0.1 to 20 µm, for example about 6 µm. Their length/diameter ratio is advantageously greater than 10 and usually greater than 100. These nanotubes therefore comprise, in particular, what are known as VGCF (vapor-grown carbon-fiber) nanotubes. Their specific surface area is for example between 100 and 300 $m^2/g$ and their bulk density may in particular be between 0.01 and 0.5 $g/cm^3$ and more preferably between 0.07 and 0.2 $g/cm^3$. The carbon nanotubes according to the invention are preferably multiwalled carbon nanotubes and may for example comprise from 5 to 15 sheets and more preferably from 7 to 10 sheets. These nanotubes may or may not be treated.

An example of raw carbon nanotubes is in particular commercially available from the company Arkema under the trade name Graphistrength® C100.

The nanotubes may be purified and/or treated (in particular oxidized) and/or milled before they are used in the invention. They may also be functionalized by chemical methods in solution, such as animation or reaction with coupling agents.

The milling of the nanotubes may especially be carried out cold or hot using known techniques implemented in equipment such as ball mills, hammer mills, grinding mills, knife or blade mills, gas jet mills or any other milling system that can reduce the size of the entangled network of nanotubes. It is preferable for this milling step to be carried out using a gas jet milling technique, in particular in an air jet mill.

The nanotubes may be purified by washing with a solution of sulphuric acid, or of another acid, so as to strip them of any residual metallic or mineral impurities resulting from their preparation process. The weight ratio of nanotubes to sulphuric acid may especially be between ½ and ⅓. The purifying operation may furthermore be carried out at a temperature ranging from 90 to 120° C., for example for a time of 5 to 10 hours. This operation may advantageously be followed by steps in which the purified nanotubes are rinsed with water and dried. Another way of purifying the nanotubes, intended in particular for removing the iron and/or the catalyst support that they contain, consists in subjecting them to a heat treatment at more than 2000° C.

The oxidation of the nanotubes is, for example, carried out by bringing them into contact with a sodium hypochlorite solution containing 0.5 to 15% NaOCl by weight and preferably 1 to 10% NaOCl by weight, for example in a nanotube/sodium hypochlorite weight ratio ranging from 1/0.1 to 1/1.

The oxidation is, for example, carried out at a temperature below 60° C. and preferably at room temperature, for a time ranging from a few minutes to 24 hours. This oxidation operation may advantageously be followed by steps in which the oxidized nanotubes are filtered and/or centrifuged, washed and dried.

The nanotubes may be functionalized by grafting reactive units such as vinyl monomers to the surface of the nanotubes. The constituent material of the nanotubes is used as a radical polymerization initiator after having been subjected to a heat treatment at more than 900° C., in an anhydrous, oxygen-free medium, which is intended to remove the oxygenated groups from its surface. It is thus possible to polymerize methyl methacrylate or hydroxyethyl methacrylate to the surface of carbon nanotubes with a view to facilitating, in particular, the dispersion thereof in PVDF or polyamides.

Use is preferably made, in the present invention, of raw, optionally milled, nanotubes, that is to say of nanotubes that are neither oxidized nor purified nor functionalized and that have not undergone any other chemical and/or heat treatment.

According to the invention, the CNTs are advantageously in powder form.

Moreover, it is preferable according to the invention to use carbon nanotubes obtained from raw materials derived from renewable sources, particularly plant sources, as described in document EP 1 980 530.

The amount of nanotubes used according to the invention represents from 0.1% to 50% by weight, preferably from 10% to 40% by weight, in particular from 15% to 40% by weight, for example from 20% up to 35% by weight, relative to the total weight of the composite.

The amount of graphenes used according to the invention represents from 0.1% to 20% and preferably from 1% to 10%, for example from 2% to 7% by weight relative to the total weight of the composite. As graphenes, use may be made for example of graphenes having a thickness of less than 10 nm and a lateral extension of the order of a micron, sold under the trademark Vor-X by Vorbeck Materials, or of the graphenes from Angstron Materials, of NGP type, as is or oxidized, which have a thickness of less than 0.5 nm, 10 nm or 100 nm, depending on the number of sheets, with lateral dimensions of the order of a micron.

According to the invention, the graphenes and the carbon nanotubes (raw or milled and/or purified and/or oxidized and/or functionalized by a non-plasticizing molecule) are brought into contact with at least one polymer composition comprising at least one thermoplastic polymer and/or elastomer. The term "polymer composition", according to the invention, also covers oligomers, and also alloys of thermoplastic polymers with themselves, of elastomers with themselves, or of one with the other.

The term "thermoplastic polymer" is understood, in the context of the invention, to mean a polymer that melts when it is heated and which can be formed and reformed in the melt state.

This thermoplastic polymer may in particular be chosen from: olefin homopolymers and copolymers, such as acrylonitrile-butadiene-styrene copolymers, styrene-butadiene-alkyl methacrylate (or SBM) copolymers; polyethylene, polypropylene, polybutadiene and polybutylene; acrylic homopolymers and copolymers and polyalkyl (meth)acrylates, such as polymethyl methacrylate; homopolyamides and copolyamides; polycarbonates; polyesters, including polyethylene terephthalate and polybutylene terephthalate; polyethers, such as polyphenylene ether, polyoxymethylene, polyoxyethylene or polyethylene glycol and polyoxypropylene; polystyrene; styrene/maleic anhydride copolymers; polyvinyl chloride; fluoropolymers, such as polyvinylidene fluoride, polytetrafluoroethylene and polychlorotrifluoroethylene; natural or synthetic rubbers; thermoplastic polyurethanes; polyaryletherketones (PAEK), such as polyetheretherketone (PEEK) and polyetherketoneketone (PEKK); polyetherimide; polysulphone; polyphenylene sulphide; cellulose acetate; polyvinyl acetate; and blends thereof.

According to one particular embodiment of the invention, the polymer is a polycarbonate.

According to one particular embodiment of the invention, the polymer is chosen from fluoropolymers, such as polyvinylidene fluoride.

According to one particularly preferred embodiment of the invention, the polymer is chosen from homopolyamides and copolyamides.

Among the homopolyamides (PAs), mention may in particular be made of: PA-6, PA-11 and PA-12, these being obtained by the polymerization of an amino acid or of a lactam; PA-6,6, PA-4,6, PA-6,10, PA-6,12, PA-6,14, PA-6,18 and PA-10,10, these being obtained by the polycondensation of a diacid and a diamine; and aromatic polyamides, such as polyarylamides and polyphthalamides. Some of the aforementioned polymers (PA-11, PA-12 and aromatic PAs) are in particular available from Arkema under the trade name RILSAN®.

The copolyamides, or polyamide copolymers, may be obtained from various starting materials: (i) lactams; (ii) aminocarboxylic acids; or (iii) equimolar quantities of diamines and dicarboxylic acids. The formation of a copolyamide requires at least two different starting products to be chosen from those mentioned above. The copolyamide then comprises at least these two units. It may thus involve a lactam and an aminocarboxylic acid having a different number of carbon atoms, or two lactams having different molecular weights, or else a lactam combined with an equimolar amount of a diamine and of a dicarboxylic acid. The lactams (i) may in particular be chosen from lauryllactam and/or caprolactam. The aminocarboxylic acid (ii) is advantageously chosen from α,ω-aminocarboxylic acids, such as 11-aminoundecanoic acid or 12-aminododecanoic acid. As regards the precursor (iii), this may in particular be a combination of at least one $C_6$-$C_{36}$, aliphatic, cycloaliphatic or aromatic dicarboxylic acid, such as adipic acid, azelaic acid, sebacic acid, brassylic acid, n-dodecanedioic acid, terephthalic acid, isophthalic acid or 2,6-naphthalene dicarboxylic acid with at least one $C_4$-$C_{22}$, aliphatic, cycloaliphatic, arylaliphatic or aromatic diamine such as hexamethylenediamine, piperazine, 2-methyl-1,5-diaminopentane, m-xylylenediamine or p-xylylenediamine, it being understood that said dicarboxylic acid(s) and diamine(s) are used, when they are present, in equimolar amounts. Such copolyamides are in particular sold under the trade name Platamid® by Arkema.

According to another embodiment of the invention, the thermoplastic polymer may be chosen from styrene-butadiene-alkyl, especially $C_1$ to $C_8$ alkyl, methacrylate (or SBM) copolymers, in particular:

1) triblock copolymers based on polystyrene, 1,4-polybutadiene and polymethyl methacrylate (PMMA), which may be obtained by anionic polymerization as described in EP 0 524 054 and EP 0 749 987. One example of such a copolymer contains from 10 to 25% by weight of polystyrene ($M_n$=10 000 to 30 000 g/mol for example), from 5 to 30% by weight of polybutadiene ($M_n$=10 000 to 25 000 g/mol for example) and 50 to 70% by weight of PMMA ($M_n$=40 000 to 90 000 g/mol for example). Such copolymers are especially available in powder form from Arkema under the trade name Nanostrength® E41; and 2) copolymers of core-shell type consisting of a core covered with one or more shells, the core of which contains a homopolymer or copolymer of butadiene, styrene and/or alkyl, in particular $C_1$ to $C_8$ alkyl, methacrylate, in particular a copolymer of butadiene and styrene, and of which at least one shell, and preferably each of the shells, contains a homopolymer or copolymer of styrene and/or alkyl, in particular $C_1$ to $C_8$ alkyl, methacrylate. The core may thus be coated with an inner shell made of polystyrene and with an outer shell made of PMMA. Such core-shell copolymers are described in particular in WO 2006/106214. An SBM core-shell copolymer that can be used in the present invention is sold in particular by Arkema under the trade name Durastrength® E920.

The polymer composition may contain, besides the thermoplastic polymer, a plasticizer.

The term "plasticizer" is understood to mean, in the context of the present invention, a compound which, introduced into a polymer, increases its flexibility, reduces its glass transition temperature ($T_g$) and increases its malleability and/or its extensibility.

Among the plasticizers that can be used according to the invention, mention may in particular be made of:

phosphate alkyl esters and alkyl esters of hydrobenzoic acid (the preferably linear alkyl group of which contains 1 to 20 carbon atoms), of lauric acid, of azelaic acid and of pelargonic acid;

arylphosphates;

phthalates, especially dialkyl or alkylaryl phthalates, in particular alkybenzyl phthalates, the alkyl groups, which are linear or branched, independently containing 1 to 12 carbon atoms;

nitrile resins;

cyclized polybutylene terephthalate and mixtures containing such, for instance the CBT® 100 resin sold by Cyclics Corporation;

adipates, especially dialkyl adipates, for example di(2-ethylhexyl) adipate;

sebacates, especially dialkyl sebacates and in particular dioctyl sebacate;

glycol benzoates or glycerol benzoates;

dibenzyl ethers, chloroparaffins;

functionalized amphiphilic hydrocarbons such as that sold by Trillium Specialties under the trade name Trilsperse® 800;

propylene carbonate;

sulphonamides, in particular alkylsulphonamides, arylsulphonamides and arylalkylsuiphonamides, the aryl group of which is optionally substituted by at last one alkyl group containing 1 to 12 carbon atoms, such as benzenesulphonamides and toluenesulphonamides, said sulphonamides possibly being N-substituted or N,N-disubstituted by at least one preferably linear alkyl group containing 1 to 20 carbon atoms, said alkyl group optionally having an alkyl ester, an alkyl amide or an (alkyl ester) alkyl amide group;

salts of N-alkyl guanidine, the alkyl group of which is preferably linear and contains 6 to 16 carbon atoms;

glycols, such as propylene glycol; and mixtures thereof.

Among the abovementioned plasticizers, those preferred for use in the present invention comprise sulphonamides, aryl phosphates, phthalates, nitrile resins and mixtures thereof. Examples of such plasticizers are in particular: N-butylbenzenesulphonamide (BBSA), N-ethylbenzenesulphonamide (EBSA), N-propylbenzenesulphonamide (PBSA), N-butyl-N-dodecylbenzenesulphonamide (BDBSA), N,N-dimethylbenzenesulphonamide (DMBSA), para-methylbenzenesulphonamide, ortho-toluenesulphonamide, para-toluenesulphonamide, resorcinol bis(diphenyl phosphate), bisphenol A bis(diphenyl phosphate), neopentyl glycol bis (diphenyl phosphate), dioctyl phthalate, glycols, cyclized polybutylene terephthalate, functionalized amphiphilic hydrocarbons and mixtures thereof.

Mention may also be made of the plasticizers described in patent application EP 1 873 200.

The plasticizer may be used in an amount of 0 to 400% by weight, preferably 50 to 200% by weight and more preferably 75 to 150% by weight, relative to the weight of nanotubes plus graphenes employed. It may thus represent, for example, from 5 to 80% by weight and more generally from 10 to 30% by weight, relative to the total weight of the composite.

Of course, the choice of plasticizer used according to the present invention will depend on the chemical nature of the polymer matrix to be reinforced by the nanotubes. Table 1 below gives, by way of indication, a few examples of particularly appropriate plasticizer/polymer matrix combinations.

TABLE 1

Examples of polymer/plasticizer combinations

| Type of polymer to be reinforced | Examples of plasticizers that can be used |
|---|---|
| Acrylonitrile-butadiene-styrene (ABS) copolymer | Phosphate alkyl esters, aryl phosphates, aryl sulphonamides, CBT ® 100 resin |
| Styrene-butadiene-alkyl methacrylate copolymer | Phthalates, especially dioctyl phthalate; nitrile resin |
| Polymethyl methacrylate (PMMA) | Phthalates, especially di-(2-ethylhexyl) phthalate, CBT ® 100 resin |
| Styrene-ethylene-butadiene-styrene (SEBS) copolymer | Phthalates, especially dioctyl phthalate |
| Ethylene-propylene-diene monomer (EPDM) copolymer | Phthalates, especially dibutyl or dioctyl phthalate |
| Natural rubber (SBR) | Sebacates, especially dioctyl sebacate; phthalates, especially dibutyl or dioctyl phthalate |
| Polybutylene | Adipates, phthalates, pelargonates |
| Polyamides | Sulphonamides, especially BBSA, EBSA, PBSA, BDBSA and DMBSA; hydroxybenzoates, such as 1-butyl-4-hydroxybenzoate or hexadecyl-4- |

TABLE 1-continued

Examples of polymer/plasticizer combinations

| Type of polymer to be reinforced | Examples of plasticizers that can be used |
| --- | --- |
|  | hydroxybenzoate; phthalates, especially dioctyl or diisodecyl phthalate; adipates, especially di-(2-ethylhexyl) adipate; phosphates, especially tri(2-ethylhexyl) phosphate |
| Polycarbonates | Phosphate alkyl esters, aryl phosphates, phthalates, CBT ® 100 resin |
| Polyesters (including PET) | Glycols, phthalates |
| Polyphenylene ether | Glycols, phthalates, CBT ® 100 resin |
| Polystyrene | Phthalates, aryl phosphates, sebacates, adipates, azelates |
| Polyethylene, PEG and copolymers of low molecular weight | Phthalates, especially dioctyl phthalate; glycerol benzoates, especially glyceryl tribenzoate; glycols; polyethylene of very low weight |
| Polypropylene | Sebacates, especially dioctyl sebacate; polypropylene of very low weight |
| Polyvinylchloride (PVC) | Dialkyl phthalates, dialkyl adipates, azelates, sebacates, CBT ® 100 resin |
| Fluoropolymers | Phthalates, adipates, azelates, sebacates |

The term "elastomer" is understood, within the context of the present invention, to mean an elastic polymer, i.e. a polymer which withstands very large deformations, much greater than 100% and that are (almost) completely reversible. An elastomer consists of long molecular chains assembled, at rest, as "bails of thread". These chains are joined to one another by crosslinking points, entanglements or else polar bonds with mineral fillers, and form a network.

It is clearly understood that some of the polymers that can be used according to the process of the invention may be simultaneously thermoplastic and elastomeric.

From a structural viewpoint, elastomers generally consist of polymer chains connected together to form a three-dimensional network. More specifically, a distinction is sometimes made between thermoplastic elastomers, in which the polymer chains are connected together via physical bonds, such as hydrogen bonds or dipole-dipole bonds, and thermosetting elastomers, in which these chains are connected by covalent bonds, which constitute points of chemical crosslinking. These crosslinking points are formed via vulcanization processes using a vulcanizing agent which may for example be chosen, depending on the nature of the elastomer, from sulphur-based vulcanizing agents, in the presence of metal salts of dithiocarbamates; zinc oxides combined with stearic acid; optionally halogenated, difunctional phenol-formaldehyde resins, in the presence of tin chloride or zinc oxide; peroxides; amines; hydrosilanes in the presence of platinum; etc.

The present invention relates more particularly to elastomers, optionally as a mixture, which are non-reactive, that is to say non-vulcanizable (such as hydrogenated rubbers).

The elastomers may especially be chosen from: fluorocarbon or fluorosilicone polymers; nitrile resins; butadiene homopolymers and copolymers, optionally functionalized with unsaturated monomers such as maleic anhydride, (meth) acrylic acid and/or styrene (SBR); neoprene (or polychloroprene); polyisoprene; copolymers of isoprene with styrene, butadiene, acrylonitrile and/or methyl methacrylate; copolymers based on propylene and/or ethylene and especially terpolymers based on ethylene, propylene and dienes (EPDM), and also copolymers of these olefins with an alkyl (meth) acrylate or vinyl acetate; halogenated butyl rubbers; silicone resins; polyurethanes; polyesters; acrylic polymers such as polybutyl acrylate bearing carboxylic acid or epoxy functions; and also modified or functionalized derivatives thereof and mixtures thereof, without this list being limiting.

According to the invention, it is preferred to use at least one elastomer chosen from: nitrile resins, in particular copolymers of acrylonitrile and butadiene (NBR); silicone resins, in particular polydimethylsiloxanes bearing vinyl groups; fluorocarbon polymers, in particular copolymers of hexafluoropropylene (HFP) and of vinylidene difluoride (VF2) or terpolymers of hexafluoropropylene (HFP), of vinylidene difluoride (VF2) and of tetrafluoroethylene (TFE), each monomer possibly representing more than 0% and up to 80% of the terpolymer; and mixtures thereof.

The polymer composition used according to the invention may contain various additives, intended in particular to promote the subsequent dispersion of the composite in a liquid formulation, such as polymeric dispersants, in particular carboxymethyl cellulose, acrylic polymers, the polymer sold by Lubrizol under the trade name Solplus® DP310 and functionalized amphiphilic hydrocarbons such as that sold by Trillium Specialties under the trade name Trilsperse® 800, surfactants such as sodium dodecylbenzenesulphonate, and mixtures thereof. The polymer composition may also contain fillers, for example fillers other than nanotubes (especially fullerenes), silica or calcium carbonate. It may also contain UV filters, especially based on titanium dioxide, and/or flame retardants. It may, as a variant or in addition, contain at least one solvent of the thermoplastic polymer.

The composite of carbon nanotubes and graphenes according to the invention is in agglomerated solid form. The expression "agglomerated solid form" is understood within the context of the present invention to mean a hard, for example substantially cylindrical, spherical, ovoid, rectangular or prismatic, form. Mention may be made, for example, of granules, pellets and pebbles as agglomerated solid physical forms. The diameter of this agglomerated solid physical form may be between 1 mm and 10 mm, but more preferably between 2 mm and 4 mm.

According to a second aspect, the invention relates to a process for preparing said composite, comprising:

(i) mixing carbon nanotubes, graphenes and a polymer composition comprising at least one thermoplastic polymer and/or elastomer, the content of carbon nanotubes representing from 0.1% to 50% by weight and the content of graphenes representing from 0.1 to 20% by weight relative to the weight of the total mixture;

(ii) optionally, converting said mixture into an agglomerated solid physical form; and (iii) recovering the composite.

A first embodiment of step (i) consists in mixing CNTs and graphenes in powder form, with a polymer composition in the form of a powder/granule mixture ranging from 10/90 to 100/0; preferably the thermoplastic polymer or the elastomer is predominantly in the form of powder, rather than granules. The Applicant indeed demonstrated that a better dispersion of the graphene and nanotubes in the polymer matrix resulted therefrom. In practice, it will be possible to use a mixture of polymer in powder form and of polymer in granule form, in a polymer in powder form to polymer in granule form weight ratio ranging from 70130 to 100/0, more preferably from 90/10 to 100/0.

The average particle size of the polymer composition powder is, generally, between 0.1 µm and 1000 µm, preferably between 10 µm and 800 µm, and more preferably still between 50 µm and 300 µm. Advantageously, the average particle size of the polymer composition powder is between 100 µm and 150 µm.

In order to obtain this polymer powder, it is possible, for example, to mill commercially available polymer granules to the desired size.

The CNT, graphene and polymer composition powders may be mixed in a mixer which is either integrated into the processing equipment, or positioned upstream of the latter.

This mixing of powders may be carried out in conventional synthesis reactors, blade mixers, fluidized-bed reactors or in mixing equipment of the Brabender, Z-blade mixer or extruder type. According to one variant of the invention, it is thus possible to use a paddle or blade mixer.

This first step of dry mixing of powders or dry-blending step is preferably followed by a heat treatment step where the polymer passes into liquid or gaseous form in order to ensure intimate and homogeneous mixing of the polymer with the CNTs and graphenes. This heat treatment consists of an increase in temperature of the powder so that its physico-chemical properties are modified. This heat treatment is advantageously carried out in an extruder.

The conversion into an agglomerated solid form of the second step (ii) of the process according to the invention may be carried out by any method known to a person skilled in the art.

In particular, mention may be made of fluidized-bed agglomeration, which is a conventional method for obtaining granules from powder. The fluidized powder is moistened until liquid bridges form between the particles. Water, solutions, suspensions or molten materials may be sprayed in order to achieve the desired product quality. By virtue of this technology, the content of fines is considerably reduced, the fluidity and the dispersibility in water are improved, the granules obtained are very aerated and dissolve very readily. The agglomeration process, via its action, solves the problems of stability of the powdery mixtures.

Another processing method is spray granulation, which is a simultaneous process. The granules form during the evaporation of the fluid. These granules are harder and denser than via agglomeration.

It is possible, as a variant, to use a wet granulation method that consists in introducing the powder into a vertical granulator and in moistening it thoroughly by spraying. The mixture is then vigorously blended by an impeller and a chopper. In this process where the powder is compressed, the result is denser granules than via fluidized-bed agglomeration.

Another method that can be used is the injection-compression moulding process that consists in injecting a cake of molten material that is then compressed in order to fill a mould. A compressed solid product is then obtained.

In one advantageous embodiment of the process according to the invention, steps (i) and (ii) are based on a compounding process, which is a continuous process comprising kneading, cooling and granulation steps. The mixture of CNTs, graphenes and polymer composition arrives at the head of an extruder or in a first segment of the latter, and is poured into the hopper in order to feed the screw of the extruder, which is preferably a twin-screw extruder or a co-kneader. In the extruder, the mixture is heated and softened, by virtue of a worm screw which is in a barrel (tube) that is heated in order to make the material malleable. The screw drives the material towards the outlet. The outlet head of the extruder gives its shape to the exiting material. The tube or rod exits continuously, it is cooled in order to then be chopped into granules.

Thus, a second embodiment of step (i) of the process according to the invention, particularly suitable for a composite based on a thermoplastic polymer, consists in mixing the CNTs and graphenes with the thermoplastic polymer that is in the molten state, in the presence or absence of a plasticizer, the molten material generally exiting the equipment used directly in an agglomerated solid physical form, without it being necessary to carry out a supplementary step (ii).

In this embodiment, step (i) comprises the introduction, into a compounding device, of a polymer composition containing at least one thermoplastic polymer, graphenes and nanotubes, the melting of the thermoplastic polymer, then the mixing of the molten thermoplastic polymer, graphenes and nanotubes, a plasticizer possibly being added to the mixer, in a weight ratio of 0 to 400% by weight, preferably of 50 to 200% relative to the weight of nanotubes plus graphenes used, and at least 50% of the weight of said plasticizer being introduced upstream of, or into, the polymer melting zone.

The expression "compounding device" is understood, according to the invention, to mean equipment conventionally used in the plastics industry for melt-blending thermoplastic polymers and additives for the purpose of producing composites. In this equipment, the polymer composition and the additives are mixed using a high-shear device, for example a co-rotating twin-screw extruder, a co-kneader or an internal or external mixer. The molten material generally exits the equipment directly in an agglomerated solid physical form, for example in the form of granules, or in the form of rods which, after cooling, are chopped into granules.

Examples of co-kneaders that can be used according to the invention are BUSS® MDK 46 co-kneaders and those of the BUSS® MKS or MX series, sold by Buss AG, which all consist of a screw shaft provided with flights, which is placed in a heated barrel possibly consisting of several sections, and the internal wall of said barrel being provided with kneading teeth designed to cooperate with the flights so as to shear the kneaded material. The shaft is rotated and provided with an oscillatory movement in the axial direction by a motor. These co-kneaders may be equipped with a granulating system fitted for example at their outlet orifice, which may consist of an extrusion screw or a pump.

The co-kneaders that can be used according to the invention preferably have a screw L/D ratio ranging from 7 to 22, for example from 10 to 20, whereas the co-rotating extruders advantageously have an L/D ratio ranging from 15 to 56, for example from 20 to 50.

Furthermore, the compounding step is generally carried out at a temperature ranging from 30 to 450° C., for example from 70 to 400° C. This temperature, which is above the glass transition temperature ($T_g$) in the case of amorphous thermoplastic elastomers and above the melting point in the case of semicrystalline thermoplastic polymers, depends on the polymer specifically used and is generally mentioned by the polymer supplier.

As indicated above, when a plasticizer is used, at least 50% of the weight of the plasticizer is introduced into the compounding device upstream of, or in, the polymer melting zone.

In one embodiment of the invention, more particularly suitable for liquid plasticizers, the plasticizer is introduced completely or partly at the start of the polymer melting zone. In general, it is preferred to introduce from 50 to 100%, for example from 60 to 80%, by weight of the plasticizer in this zone and from 0 to 50% by weight, for example from 20 to 40% by weight, of the plasticizer downstream of the polymer melting zone.

In another embodiment of the invention, the plasticizer, the thermoplastic polymer, the graphenes and the nanotubes may, as a variant, be introduced simultaneously or in succession into the same feed hopper of the compounding device. In general, it is preferred to introduce all of the plasticizer in this hopper. The aforementioned materials may be introduced in succession, in any order, either directly into the hopper or into a suitable container where they are homogenized before being introduced into the hopper. In this embodiment, the polymer is in the form of a powder/granule mixture ranging from 10/90 to 100/0, preferably the polymer is predominantly in powder form rather than in granule form. This embodiment of the invention is very suitable for solid plasticizers. These may possibly be introduced into the feed hopper of the compounding device in the form of a precomposite with the graphenes and the nanotubes. Such a precomposite, containing 70% by weight of cyclized polybutylene terephthalate as plasticizer and 30% by weight of multiwalled nanotubes, is for example available commercially from Arkema under the trade name Graphistrength® C M12-30, to which graphenes may be added. Another way of proceeding may consist in preparing in advance a dry nanotube/graphene premix, which premix will then be measured out into the polymer matrix.

However, this embodiment of the invention may also be employed if the plasticizer is in the liquid state. In this case, the graphenes, the nanotubes and the plasticizer may be introduced into the hopper or the aforementioned container in precomposite form. Such a precomposite may for example be obtained using a process involving:

1—the contacting of a plasticizer in liquid form, possibly in the molten state or in solution in a solvent, with the powdered graphenes and nanotubes, for example by direct introduction or dispersion by pouring the plasticizer into the graphene powder/nanotube powder mixture (or vice versa), by introducing the plasticizer dropwise into the powder or by spraying the plasticizer using a sprayer onto the graphene powder/nanotube powder mixture; and 2—the drying of the precomposite obtained, possibly after removal of the solvent (typically by evaporation).

The first step 1—above may be carried out in conventional synthesis reactors, blade mixers, fluidized-bed reactors or mixing equipment of the Brabender, Z-blade mixer or extruder type. It is generally preferable to use a cone mixer, for example of the Vrieco-Nauta type from Hosokawa, comprising a rotary screw rotating along the wall of a conical vessel, or a co-kneader.

As a variant, a precomposite may be formed from the liquid plasticizer and the thermoplastic polymer, before these are mixed with the graphenes and the nanotubes.

A third embodiment of step (i) that is particularly suitable for an elastomer-based composite consists in kneading carbon nanotubes and graphenes with a liquid polymer composition comprising at least one elastomer, within a compounding device.

This compounding device is preferably a co-kneader.

The polymer composition containing the elastomer is in liquid form during its injection into the compounding device in a first zone before introduction of the CNTs. The term "liquid" is understood to mean that the composition is capable of being pumped into the compounding device, that is to say that it advantageously has a dynamic viscosity ranging from 0.1 to 30 Pa·s, preferably from 0.1 to 15 Pa·s. The viscosity may be determined using viscoelastometers such as the devices RDA2, RSA2, DSR200, ARES or RME from the constructor Rheometrics, or MCR301 from Anton Paar, methodologically following the steps described in the operating manuals.

The elastomer may itself exhibit this viscosity either at room temperature (23° C.), or after having been heated before injection into the co-kneader in order to give it the desired viscosity. A person skilled in the art will know how to identify such elastomers, as a function, in particular, of the molecular weight of their constituent polymers. In one variant of the invention, the elastomer may be solid, for example in gum form. In this case, the polymer composition may contain, besides this elastomer, at least one processing auxiliary in liquid or waxy form, such as a fluoropolymer, in particular an optionally functionalized perfluoropolyether and/or a vinylidene fluoride/hexafluoropropylene copolymer.

In another variant, the elastomer may be introduced in solid form, for example in the form of particles milled in the co-kneader and liquefied in the co-kneader via heating and shear before introduction of the CNTs and graphenes.

After the process according to the invention has been completed, a composite is recovered in an agglomerated solid physical form comprising a high content of CNTs and graphenes.

This composite may either be used as is, or be used as a masterbatch and therefore be diluted in a polymer matrix in order to form a composite end product.

Another subject of the invention is the use of the composite described previously for manufacturing a composite end product and/or with a view to conferring at least one electrical, mechanical and/or thermal property on a polymer matrix. A heating step may be carried out in order to fix the electrical, mechanical and/or thermal properties of the composite end product, via any known means, for example via microwaves.

Another subject of the invention is a process for manufacturing a composite product comprising:

manufacturing a composite according to the process described previously, and introducing the composite into a polymer matrix.

This process may comprise a step of final shaping of the composite product depending on the envisaged use.

In one embodiment of the invention, the compounding device, in which the composite is manufactured, may be coupled to another device intended to be fed, on the one hand, with the composite and, on the other hand, with the polymer matrix. This other device may, in this case, be provided with a die for shaping the composite product formed.

In this embodiment of the invention, the composite end product may contain from 0.1 to 8% by weight of graphenes and, for example, from 0.1 to 20% by weight of nanotubes.

In another embodiment of the invention, the composite end product may contain from 0.1 to 4% by weight of graphenes and, for example, from 0.1 to 10% by weight of nanotubes.

The polymer matrix generally contains at least one polymer chosen from gradient, block, random or sequential homopolymers or copolymers, thermoplastic or thermosetting homopolymers or copolymers, rigid or elastomeric homopolymers or copolymers, and crystalline, amorphous or semicrystalline homopolymers or copolymers. Preferably, according to the invention, at least one thermoplastic polymer and/or one elastomer are used, which may in particular be selected from those listed above.

In the case where the composite prepared as described previously contains a polymer of polystyrene/polybutadiene/poly($C_1$ to $C_8$ alkyl methacrylate) or SBM type, the polymer matrix may in particular include a polymer such as polyvinyl chloride or PVC.

The polymer matrix may also contain various adjuvants and additives, such as lubricants, pigments, stabilizers, fillers or reinforcements, antistatic agents, fungicides, fire retardants and solvents.

The composite end product according to the invention may be used for the manufacture of fluid transporting or storage devices, such as pipes, tanks, offshore pipelines or hoses, for example for the purpose of preventing the accumulation of electrostatic charges. As a variant, this composite product may be used for the manufacture of compact or porous electrodes, especially for supercapacitors or batteries.

In certain embodiments of the invention, the composite according to the invention may be used to stiffen and/or thicken a liquid formulation, which may or may not contain a polymer matrix. This liquid formulation then contains at least one solvent for the thermoplastic polymer. For example, if the thermoplastic polymer is a water-soluble polyethylene glycol, the liquid formulation may contain water. The invention thus offers a means for stiffening and/or thickening a liquid formulation containing at least one solvent for the thermoplastic polymer, for example in particular an ink, varnish, paint, mastic, bituminous product or concrete composition. One subject of the invention is therefore also the aforementioned use of the composite described above.

In other embodiments, the composite according to the invention may be used to manufacture conductive fibres (obtained in particular by melt processing) or conductive single-layer or multilayer films, i.e. having in general an electrical resistivity ranging from $10^{-1}$ to $10^8$ ohm·cm. It has in fact been demonstrated that the process according to the invention makes it possible to obtain composites capable of being converted in particular into extruded films or fibres having better electrical conductivity and as good mechanical properties as those of the prior art. These fibres may in particular be employed in the manufacture of conductive fabrics. In these applications, it is preferred for the plasticizer to be chosen from: cyclic oligobutyl (or polybutylene) terephthalates, functionalized amphiphilic hydrocarbons, alkylsulphamides and mixtures thereof.

EXAMPLES

Example 1

Manufacture of CNT/Graphene/Polyamide PA-12 Composites

Four formulations, namely 1A and 1C (comparative formulations) and 1B and 1D (formulations according to the invention), the compositions of which are indicated in Table 2, were introduced into a BUSS® MDK 46 co-kneader (L/D=11).

The graphenes come from Angstron under the reference N006-010.

The all-solid ingredients of formulations 1A and 1B were introduced into a single hopper.

The ingredients of 1C and 1D were partly introduced into the same hopper (polyamide and nanotubes) and partly injected (BBSA) with a volumetric metering pump into the first zone of the co-kneader, which corresponds to the start of melting of the polymer.

TABLE 2

|  | 1A comp | 1B | 1C comp | 1D |
|---|---|---|---|---|
| Nanotubes: CNT (Graphistrength ® C100 from Arkema) | 20% | 15% | 20% | 15% |
| Polymer 1: PA-12 (150-300 µm Rilsan ® AMNO TLD powder from Arkema) | 75% | 75% | 50% | 65% |
| Polymer 2: PA-12 (Rilsan ® AMNO TLD granules from Arkema) | 5% | 5% | 5% | 5% |
| Graphenes | — | 5% | — | 5% |
| Plasticizer: BBSA (liquid) | — | — | 25% | 10% |

The temperature setpoints and the throughput were identical for the formulations (zone 1/zone 2 of co-kneader: 280/290° C.; throughput: 13 kg/h).

It was observed that formulation 1A was more viscous and resulted in the co-kneader having a power consumption of 5.8-5.9 kW, therefore close to the nominal power (6.0 kW) indicated by the manufacturer. Furthermore, the temperature of the material in the last zone of the co-kneader rose to about 315° C.

In contrast, the power drawn by formulations 1B to 1D, which were less viscous, was between 4.9 kW and 5.5 kW only and the production conditions remained steady. The temperature of the material in the final zone of the co-kneader was only 290-300° C.

Moreover, it was observed that formulation 1A generated deposits in the co-kneader, unlike formulations 1B to 1D.

It follows from this example that the process according to the invention makes it possible to manufacture a composite highly filled with carbon nanotubes under milder conditions than a process not using graphenes. Furthermore, it is confirmed that the graphenes can at least partly replace BBSA as plasticizer. This process therefore makes it possible for composites to be continuously manufactured without degrading the polymer matrix or causing unacceptable contamination of the equipment.

Example 2

Manufacture of Composite Products from CNT/Graphene/Polyamide PA-12 Composites

The composites 1A, 1B, 1C and 1D of Example 1 were diluted in PA-12 in a co-rotating twin-screw extruder (diameter: 16 mm; L/D=25) at various temperatures so as to obtain composite products containing 2% by weight of CNTs (1A and 1C) or 1.5% by weight of nanotubes plus 0.5% by weight of graphenes (1B and 1D).

The resistivity of the composite products obtained was then measured and the curve illustrated in FIG. 1 plotted.

As is apparent from this figure, in the process window, i.e. 230-290° C., the composite products manufactured according to the invention 1B and 1D (nanotubes plus graphenes)

have electrical conduction properties at lower temperatures than the comparative composite products 1A and 1C (nanotubes alone). The invention therefore makes it possible to obtain composite products under milder process conditions, preserving the polymer matrix.

Very similar results were obtained by replacing the PA-12 of Examples 1 and 2 with PA-11 (Rilsan® BMNO TLD from Arkema).

Example 3

Manufacture of CNT/Graphene/Polyamide PA-6 Composites

Two formulations, namely 3A (comparative formulation) and 3B (formulation according to the invention), the compositions of which are given in Table 3, were introduced into a BUSS® MDK 46 co-kneader (L/D=11).

TABLE 3

|  | Formulation 3A | Formulation 3B |
| --- | --- | --- |
| Nanotubes:<br>CNT (Graphistrength ® C100 from Arkema) | 20% | 15% |
| Polymer 1:<br>PA-6 (Grade: 150-300 µm Domamid ® 24 powder from Domo Chemicals) | 75% | 75% |
| Polymer 2:<br>PA-6 (Grade: Domamid 24 ® granules from Domo Chemicals) | 5% | 5% |
| Graphenes | — | 5% |

The all-solid ingredients of the formulations were introduced into a single hopper. The temperature setpoints and the throughput were the same for both formulations (zone 1/zone 2 of the co-kneader: 290/290° C.; throughput: 11 kg/h).

It was observed that formulation 3A was more viscous and resulted in a co-kneader power consumption of 5.7-5.8 kW, which after 10 h of compounding exceeded the nominal power (6.0 kW) indicated by the manufacturer, thus requiring the throughput to be lowered to 10 kg/h. Furthermore, the temperature of the material in the final zone of the co-kneader rose to about 320° C.

In contrast, the power drawn by formulation 3B, which was less viscous, was only 5.5-5.6 kW and the production conditions remained steady. The material temperature in the final zone of the co-kneader was only 300° C. Furthermore, there was no contamination on the walls of the machine, unlike in the process using formulation 3A.

It is apparent from this example that the process according to the invention makes it possible for composites highly filled with CNTs to be continuously manufactured without degrading the polymer matrix or contaminating the equipment.

Example 4

Manufacture of Composite Products from CNT/Graphene/Polyamide PA-6 Composites

The composites of Example 3 were diluted in PA-6 in a co-rotating twin-screw extruder (diameter: 16 mm; L/D=25), at various temperatures so as to obtain composite products containing 3% by weight of nanotubes (3A) or 2.25% by weight of nanotubes plus 0.75% by weight of graphenes (3B).

Figure 2:
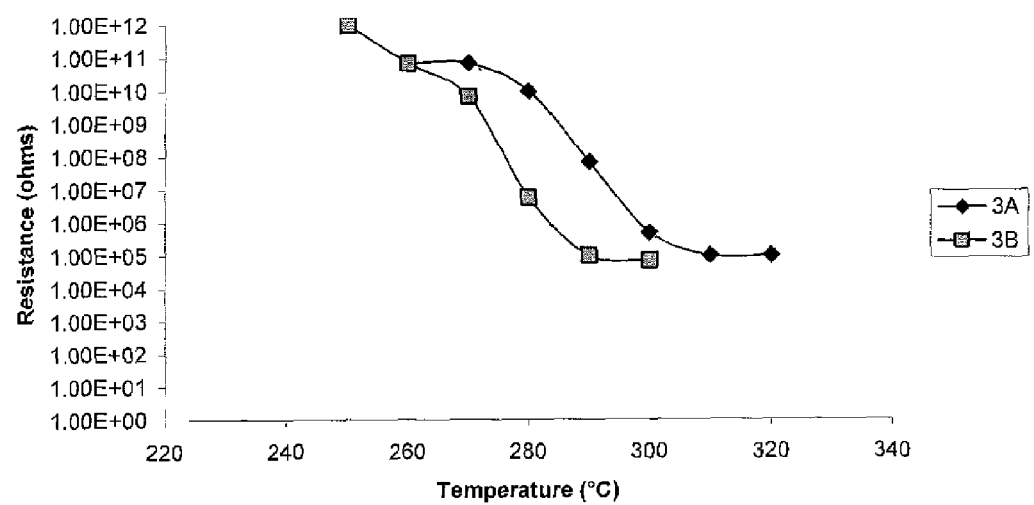
FIG. 2 illustrates the resistivity curve as a function of temperature of a composite end product obtained according to the invention and of a comparative composite end product, based on PA-6.

The resistivity of the composite products obtained was then measured and the curve illustrated in FIG. 2 plotted.

As is apparent from this figure, processing the composite manufactured according to the invention makes it possible to reduce the temperature for manufacturing the composite product by 20° C., while still giving said product the same electrostatic dissipation properties.

Example 5

Manufacture of CNT/Graphene/Polycarbonate Composites

Two formulations, namely 5A (comparative formulation) and 5B (formulation according to the invention), the compositions of which are indicated in Table 4, were introduced into a BUSS® MDK 46 co-kneader (L/D=11).

TABLE 4

|  | Formulation 5A | Formulation 5B |
| --- | --- | --- |
| Nanotubes:<br>CNT (Graphistrength ® C100 from ARKEMA) | 15% | 15% |
| Polymer 1:<br>polycarbonate (Grade: 150-300 µm Makrolon ® 2207 powder from BAYER) | 80% | 75% |
| Polymer 2:<br>polycarbonate (Grade: Makrolon ® 2207 granules from BAYER) | 5% | 5% |
| Graphenes | — | 5% |

The all-solid ingredients of the formulations were introduced into a single hopper. The temperature setpoints were similar for both formulations (zone 1/zone 2 of the co-kneader: 300/260° C. and 310/270° C.).

It should be noted that it was not possible to raise the CNT content in formulation 5A to 20% without causing degradation of the composite formed. Furthermore, even at the CNT content tested, the material temperature exceeded 320° C. for a very moderate throughput of 10-11 kg/h.

In contrast, using formulation 5B which nevertheless contained 20% by weight of solids (CNT+graphenes), the production remained steady for about 40 h with a throughput of 15 kg/h, without the material temperature exceeding 300° C.

It follows from this example that the method according to the invention allows composites highly filled with CNTs/graphenes to be continuously manufactured without degrading the polymer matrix.

These composites, such as formulation 5B, may be diluted down to 2-3% by weight of CNTs in a polymer matrix based on polycarbonate, ABS resin or ABS/styrene copolymer for the manufacture of conductive materials that are fire-retardant (i.e. having a V0 index in the UL94 fire test and an LOI of greater than 32%).

Example 6

Manufacture of Composite Products from CNT/Graphene/Polycarbonate Composites

The composites of Example 5 were diluted in polycarbonate in a co-rotating twin-screw extruder (diameter: 16 mm; L/D=25) at various temperatures so as to obtain composites containing 2% by weight of nanotubes (5A) or 1.5% by weight of nanotubes plus 0.5% by weight of graphenes (5B).

Figure 3:
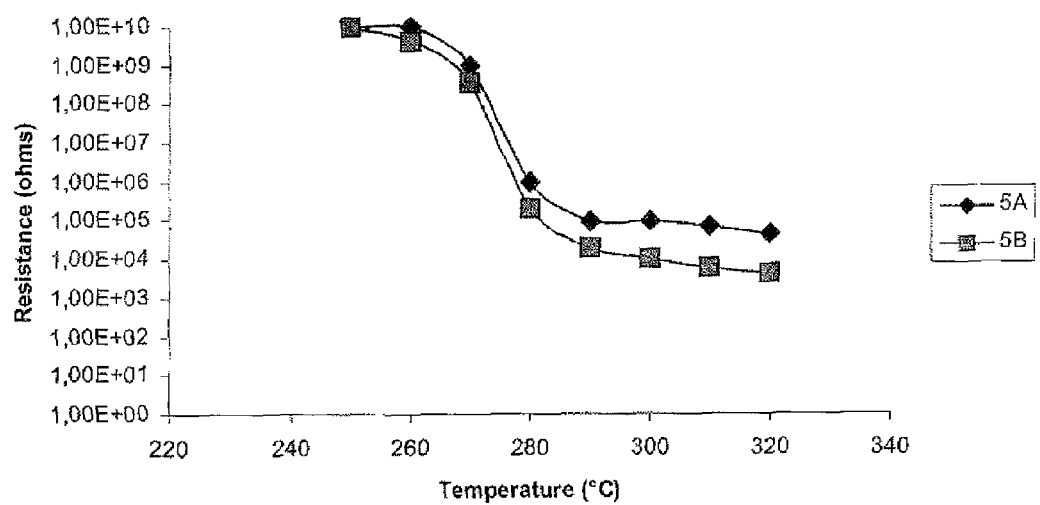
FIG. 3 illustrates the resistivity curve as a function of temperature of a composite end product obtained according to the invention and of a comparative composite end product, based on a polycarbonate.

The resistivity of the composite products obtained was then measured and the curve illustrated in FIG. 3 plotted.

As is apparent from this figure, processing the composite manufactured according to the invention makes it possible to reduce the resistance of the composite product by almost a factor of 10.

Example 7

Manufacture of a Composite According to the Invention Containing a Nitrile Resin Base Introduced into the first feed hopper of a BUSS® MDK 46 co-kneader (L/D=11), equipped with an extrusion screw and a granulating device, were carbon nanotubes (Graphistrength® C100 from Arkema), graphenes and an acrylic copolymer powder (Nanostrength® M52N from Arkema). A butadiene-acrylonitrile copolymer (NIPOL® 1312V from Hallstar) was preheated to 160° C. then injected in liquid form at 190° C. into the 1st zone of the co-kneader. The temperature setpoints and the throughput within the co-kneader were set at 200° C. and 12 kg/h respectively. The rotational speed of the screw was 240 rpm.

At the outlet of the equipment, a homogeneous rod was obtained which was chopped, under a jet of water, into granules consisting of a composite containing 35% by weight of CNTs, 5% by weight of graphenes, 55% by weight of nitrile resin and 5% by weight of acrylic copolymer. These granules were then dried at approximately 50° C. before being conditioned.

These granules may then be diluted in a polymer matrix containing a vulcanizing agent, and shaped.

As a variant, one portion of the nitrile resin (from 5 to 10% by weight) may be introduced into the co-kneader in solid, granulated or milled, form for example into the first feed hopper.

Example 8

Manufacture of a Composite According to the Invention Containing a Silicone Elastomer Resin Base Carbon nanotubes (Graphistrength® C100 from Arkema) and graphenes were introduced into the first feed hopper of a BUSS® MDK 46 co-kneader (L/D=11) equipped with an extrusion screw and a granulating device. A linear polydimethylsiloxane having vinyl ends (Silopren® U10 from Momentive) was introduced at a temperature of approximately 40-60° C., partly into the 1st zone of the co-kneader and partly after the 1st restriction ring of the co-kneader. The kneading was carried out at 90-110° C.

At the outlet of the equipment, a homogeneous rod was obtained which was chopped, under a jet of water, into granules consisting of a composite containing 30% by weight of CNTs, 5% by weight of graphenes and 65% by weight of silicone resin. These granules were then dried at approximately 50° C. before being conditioned.

These granules may then be diluted in a polymer matrix containing a vulcanizing agent, for example in a silicone matrix for the manufacture of seals or in a rubber matrix for the manufacture of tyres.

Example 9

Manufacture of a Composite According to the Invention Containing a Fluoroelastomer Resin Base Prepared, in the same co-kneader as that described in Example 8, was a formulation containing: 30% by weight of carbon nanotubes; 5% by weight of graphenes; 64% by weight of the fluoroelastomer Viton® A100 from Du Pont, used in the form of a 1-5 mm ground particles; and 1% by weight of a processing auxiliary consisting of a functionalized perfluoropolyether sold by Solexis under the trade name Technoflon® FPA1.

The constituents of this formulation were all introduced into the first feed hopper of the co-kneader. After kneading at 160-180° C., a rod of composite was obtained, which was chopped into granules.

This composite may be diluted in a polymer matrix at room temperature in order to manufacture a composite product.

Example 10

Manufacture of a Composite According to the Invention Containing a Fluoroelastomer Resin Base Prepared, in the same co-kneader as that described in Example 8, was a formulation containing: 35% by weight of carbon nanotubes; 5% by weight of graphenes; 39% by weight of the same fluoroelastomer as in Example 10; 20% by weight of a fluoroelastomer (vinylidene fluoride/hexafluoropropylene copolymer) liquid resin sold by Daikin America under the trade name Daikin® DAI-EL G101; and 1% by weight of the same processing auxiliary as in Example 9.

The constituents of this formulation were all introduced into the first feed hopper of the co-kneader, apart from the resin which was injected at 160° C. After kneading at 160-180° C., a rod of composite was obtained, which was chopped into granules.

This composite may be diluted in a polymer matrix, especially based on fluoro homopolymers or copolymers, in order to manufacture a composite product. As a variant, it may be used as is for the manufacture of petrol transport pipes.

Example 11

Manufacture of a Composite According to the Invention Containing a Solid Fluoroelastomer Resin Base Introduced, into the first feed hopper of a BUSS® MDK 46 co-kneader (L/D=11), equipped with an extrusion screw and a granulating device, was the resin VITON® A100 in the form of solid particles, metered by the gravimetric metering pump, using a strip-feeding device.

Carbon nanotubes (Graphistrength® C100 from Arkema) and graphenes were introduced into the 2nd feed zone, after the resin had been liquefied in the 1st zone of the co-kneader. The temperature setpoints within the co-kneader were set at 150° C. in Zone 1 and 140° C. in Zone 2 and the throughput was set at 12 kg/h. The rotational speed of the screw was 200 rpm.

At the outlet of the 4×4 mm die, a homogeneous rod was obtained which was chopped, under a jet of water, into granules consisting of a composite containing 18% by weight of CNTs and 2% of graphenes. These granules were then dried at approximately 50° C. before being conditioned.

These granules may then be diluted in a polymer matrix containing a vulcanizing agent, and shaped.

The invention claimed is:
1. Composite of carbon nanotubes and of graphenes comprising:
  a) carbon nanotubes, the content of which represents from 10% to 50% by weight relative to the total weight of the composite;

b) graphenes, the content of which represents from 0.1% to 10% by weight relative to the total weight of the composite; and c) a polymer composition comprising at least one thermoplastic polymer and/or one elastomer;

wherein the composite is in agglomerated solid form.

2. Composite according to claim 1, wherein the carbon nanotubes are multiwalled, the multiwalled carbon nanotubes comprising from 5 to 15 sheets.

3. Composite according to claim 1, wherein the polymer composition comprises a thermoplastic polymer selected from the group consisting of: olefin homopolymers and copolymers; acrylic homopolymers and copolymers and polyalkyl (meth)acrylates; homopolyamides and copolyamides; polycarbonates; polyesters polyethers; polystyrene; styrene/maleic anhydride copolymers; polyvinyl chloride; fluoropolymers; natural or synthetic rubbers; thermoplastic polyurethanes; polyaryletherketones (PAEK); polyetherimide; polysulphone; polyphenylene sulphide; cellulose acetate; polyvinyl acetate; and blends thereof.

4. Composite according to claim 3, wherein the polymer composition further comprises a plasticizer selected from the group consisting of:
phosphate alkyl esters and alkyl esters of hydrobenzoic acid, lauric acid, azelaic acid or pelargonic acid;
arylphosphates;
phthalates;
nitrile resins;
cyclized polybutylene terephthalate and mixtures containing such;
adipates;
sebacates;
glycol benzoates or glycerol benzoates;
dibenzyl ethers,
chloroparaffins;
functionalized amphiphilic hydrocarbons;
propylene carbonate;
sulphonamides;
salts of N-alkyl guanidine
propylene glycol or other glycols; and
mixtures thereof.

5. Composite according to claim 1, wherein the polymer composition comprises a thermoplastic polymer which is a homopolyamide or copolyamide and optionally a plasticizer selected from the group consisting of sulphonamides, hydroxybenzoates, phthalates, adipates and phosphates.

6. Composite according to claim 1, wherein the polymer composition comprises a thermoplastic polymer which is a polycarbonate and optionally a plasticizer selected from the group consisting of phosphate alkyl esters, aryl phosphates and phthalates.

7. Composite according to claim 1, wherein the polymer composition comprises a thermoplastic polymer which is a styrene-butadiene-methyl methacrylate copolymer and optionally a plasticizer selected from the group consisting of phthalates and nitrile resins.

8. Composite according to claim 1, wherein the polymer composition comprises an elastomer selected from the group consisting of: fluorocarbon or fluorosilicone polymers; nitrile resins; butadiene homopolymers and copolymers, optionally functionalized with unsaturated monomers; neoprene; polychloroprene; polyisoprene; copolymers of isoprene at least one of with styrene, butadiene, acrylonitrile and methyl methacrylate; copolymers comprising at least one of propylene and ethylene; halogenated butyl rubbers; silicone resins; polyurethanes; polyesters; acrylic polymers; and modified or functionalized derivatives thereof and mixtures thereof.

9. Composite according to claim 8, wherein the elastomer is selected from the group consisting of: nitrile resins; silicone resins; fluorocarbon polymers; and mixtures thereof.

10. The composite according to claim 1, wherein said carbon nanotubes represents from 10% to 40% by weight relative to the total weight of the composite.

11. The composite according to claim 1, wherein said graphenes represents from 1% to 10% by weight relative to the total weight of the composite.

12. The composite according to claim 10, wherein said graphenes represents from 1% to 10% by weight relative to the total weight of the composite.

13. The composite according to claim 1, wherein the agglomerated solid form comprises substantially cylindrical, spherical, ovoid, rectangular, prismatic, granule, pellet or pebble forms, or mixtures thereof.

14. The composite according to claim 1, wherein the polymer composition represents at least about 60% by weight relative to the total weight of the composite.

* * * * *